United States Patent
Qing et al.

(10) Patent No.: US 7,949,171 B2
(45) Date of Patent: May 24, 2011

(54) SYSTEM AND METHOD FOR TRACING RIB POSTERIOR IN CHEST CT VOLUMES

(75) Inventors: Shuping Qing, Princeton, NJ (US); Hong Shen, Plainsboro, NJ (US)

(73) Assignee: Siemens Corporation, Iselin, NJ (US)

( * ) Notice: Subject to any disclaimer, the term of this patent is extended or adjusted under 35 U.S.C. 154(b) by 927 days.

(21) Appl. No.: 11/549,723

(22) Filed: Oct. 16, 2006

(65) Prior Publication Data
US 2007/0223795 A1  Sep. 27, 2007

Related U.S. Application Data

(60) Provisional application No. 60/728,068, filed on Oct. 19, 2005.

(51) Int. Cl.
*G06K 9/00* (2006.01)
(52) U.S. Cl. ........................................ 382/131
(58) Field of Classification Search ............. 382/100, 382/128, 129, 130, 131, 132, 133, 134, 173, 382/181; 600/300; 128/920; 378/1, 37, 378/21, 41, 42, 38, 44, 51
See application file for complete search history.

(56) References Cited

U.S. PATENT DOCUMENTS

| | | | | |
|---|---|---|---|---|
| 6,201,543 | B1 * | 3/2001 | O'Donnell et al. | 345/420 |
| 6,594,378 | B1 * | 7/2003 | Li et al. | 382/128 |
| 6,608,916 | B1 * | 8/2003 | Wei et al. | 382/132 |
| 6,850,635 | B2 * | 2/2005 | Gerard et al. | 382/132 |
| 2002/0184470 | A1 * | 12/2002 | Weese et al. | 712/1 |
| 2003/0086596 | A1 * | 5/2003 | Hipp et al. | 382/128 |
| 2006/0062425 | A1 * | 3/2006 | Shen et al. | 382/100 |
| 2006/0149511 | A1 * | 7/2006 | Kaus et al. | 703/2 |
| 2006/0228009 | A1 * | 10/2006 | Fidrich et al. | 382/128 |
| 2007/0047790 | A1 * | 3/2007 | Dewaele | 382/128 |
| 2008/0075348 | A1 * | 3/2008 | Rappaport et al. | 382/132 |

FOREIGN PATENT DOCUMENTS
WO  WO 2004/053792 A1 *  6/2004

OTHER PUBLICATIONS

NIST/SEMATECH, NIST/SEMATECH e-Handbook of Statistical Methods, http://www.itl.nist.gov/div898/handbook/, Sections 6.4, 6.4..3.3, pp. 1-2, Date created Oct.-Dec. 2002, Date accessed Nov. 2009.*
Huang et al., "Untangling knots by stochastic energy optimization" IEEE Visualization Archive, 1996.*
Hong Shen, et al, "Tracing Based Segmentation for the Labeling of Individual Rib Structures in Chest CT Volume Data", Miccai 2004 vol. 3217/2004,967-974.
William T. Freeman, et al., "The Design and Use of Steerabel Filters" *IEEE Transactions on Pattern Analysis and Machine Intelligence*, vol. 13, No. 9 Sep. 1991, pp. 891-905.
U.S. Appl. No. 11/203,792, filed Aug. 15, 2005.

* cited by examiner

*Primary Examiner* — Bhavesh M Mehta
*Assistant Examiner* — Tahmina Ansari

(57) ABSTRACT

A method for tracing, rib posteriors includes providing an incomplete rib tracing comprising a digitized 3-dimensional representation of a rib and a digital image from which said rib tracing was extracted, initializing, a tracing direction for a remainder of said rib, detecting a plurality of ridge points in a sub-volume of said digital image about said initial tracing direction, and deforming a closed curve in a plane perpendicular to said tracing direction until a rib-edge contour is obtained, using said ridge points as constraints.

23 Claims, 5 Drawing Sheets

Rib posteriors not traced

New edge locations

SYSTEM AND METHOD FOR TRACING RIB POSTERIOR IN CHEST CT VOLUMES

CROSS REFERENCE TO RELATED UNITED STATES APPLICATIONS

This application claims priority from: "A Robust Method of Tracing Rib Posterior in Chest CT Volumes", U.S. Provisional Application No. 60/728,068 of Qing, et al., filed Oct. 19, 2005, the contents of which are incorporated herein by reference.

TECHNICAL FIELD

This invention is directed to 3D visualization of rib structures in medical computer-aided diagnosis (CAD) systems.

DISCUSSION OF THE RELATED ART

The advances in medical imaging equipment have brought efficiency and high capability imaging modalities, such as multi-slice CT scanners, produce large amount of digital data that is difficult and tedious to be interpreted merely by physicians. Computer Aided Diagnosis (CAD) systems will therefore play a critical role, especially in the visualization, segmentation, detection, registration, and reporting of medical pathologies. Due to the large volume of the data involved and the on-time requirement of medical applications, feature based algorithms will be one of the most frequently applied methods to accomplish these tasks effectively and efficiently.

From a system viewpoint, the rib structures are useful for the reference and registration of other anatomies and pathologies. The ribs have valuable properties common to bone tissues: they are rigid and stable in shape, and map to prominent intensities in CT data. Further, the rib structures enclose the complete chest area and part of lower abdomen, and are relatively less affected by lung surgery. In addition, the ribs are highly ordered and symmetrical, and it has been observed that each pairs of ribs roughly forms a plane, specifically a slanted plane that makes a significant angle with the axial plane. Because of these properties, the rib feature group can be used for reliable registration and reference. Certainly, to make full use of the structural advantage of the ribs, they should be extracted and labeled individually.

Three-dimensional visualization and labeling of rib structures in a CAD system provide important information for radiologists since diagnostic information obtained from evaluation of the ribs can help them analyze and monitor pathologies pertaining to the ribs. Abnormalities detected in the ribs may be the initial indication of certain diseases. The ribs can yield important diagnostic information of patients with congenital bone dysplasias, acquired metabolic diseases, trauma, infection, and neoplasms. Also, the rib feature group can be used for reliable registration and reference. To make full use of the structural advantages of the ribs, they should be extracted and labeled individually. There are 12 pairs of rib structures in a human body with 8-10 pairs visible in a chest computed tomography (CT) volume dataset. They are connected at one end with the spine, and the upper pairs are also connected to the sternum.

It is challenging to obtain good results from rib segmentation. Although a majority of bone voxels have higher intensities (>1200) than the surrounding tissues (700-1100), the lowest bone intensity and highest tissue intensity levels are quite close. With noise and partial volume effect, this narrow buffer zone is frequently crossed, and therefore no clear-cut intensity threshold exists between bone and other tissues.

Tracing rib posteriors is challenging due to the fact that ribs and vertebrae are so close at the posterior junctions that the gaps between them are vague and hard to locate. Edge detectors have difficulty locating rib edges in the posterior section and the results are usually inaccurate. This is because the junction area (where rib and vertebrae are very close or connected) contains a mixture of lines, edges and other contour-like structures, and a linear edge detector cannot respond appropriately to the various contour structures. Since the 1970s, many methods to detect and label ribs automatically in 2D chest radiographs have been developed, but there has been little work in 3D extraction of individual rib structures. One segmentation method to segment vertebra and ribs from 3D CT images could remove vertebra and ribs for better visualization of interested organs. The focus of this method is to detect and prevent a leakage from propagation. The vertebra and ribs are removed as a whole. Other approaches include eliminating the ribs and other connected bone structures from the data using region-based approaches. Although the intensity of rib bone is much higher than the surrounding tissues, these region growing methods fail to provide satisfactory results.

Shen et al, in "Tracing Based Segmentation for the Labeling of Individual Rib Structures in Chest CT Volume Data", *International Conference on Medical Image Computing and Computer-Assisted Intervention* (MICCAI) 2004, the contents of which are incorporated herein by reference, developed a tracing based algorithm to extract individual rib centerlines and boundaries, a sample result of which is shown in FIG. 1. This algorithm performs 2D edge detection at each time step. The detected edge points on certain directions are kept as contour points on this plane. A principle component analysis (PCA) is applied to these points to predict a next tracing direction. At the next time step, a new plane is formed perpendicular to the tracing direction, and a new center is calculated and validated based on the previous center. The tracing stops when a stopping criterion is satisfied. The algorithm extracts about 20 sample points at each tracing step, which represent the local contour and outer surface shape. The sample points from all steps form the global contour and outer surface. From these sample points, an approximate rib outer surface can be obtained using a surface reconstruction algorithm. This method works well in labeling each rib except at posterior junctions with the vertebrae. However, as shown in FIG. 1 by the arrows pointing to untraced rib posteriors, each tracing routine stops at a certain point in the posterior section, due to a lack of accurate detected rib edge points, and therefore the energy term used as a criterion for verifying a correct tracing path is no longer valid. Because ribs are so close or even connected to the vertebrae at the posterior, the procedure of locating rib edge points on the 20 directions no longer applies.

Accurate tracing of rib posteriors is desirable because (1) it achieves the goal of segmenting each individual rib, (2) it can provide reference marks for vertebrae segmentation, and (3) it provides the true position of the rib-end and is therefore useful when building a thoracic atlas.

SUMMARY OF THE INVENTION

Exemplary embodiments of the invention as described herein generally include methods and systems for fast and robust tracing of rib posteriors that searches for a rib edge location by using the ridge as a constraint. As a follow-up to an edge-based rib tracing method of individual ribs in a CT volume, a method according to an embodiment of the invention completes the tracing by tracing into the rib posterior segments and stopping before the vertebrae. A method according to an embodiment of the invention uses a 2D ridge detector together with a deformable mode to locate rib edges. The tracing will stop at the end of rib posteriors. A chest CT volume is used as input. Starting from a seed point found by a seed-searching method, an edge-based tracing should be performed first. The edge-based tracing will stop at a certain point where another bone-like structure is present in the rib cross-section plane that is close to the rib bone. Then a method according to an embodiment of the invention takes over and continues tracing the posterior segments until the rib end. Since contour deformation according to an embodiment of the invention is performed with a small set sample points, the mathematics is simple and leads to rapid computation. The results can be used in rib labeling or 3D visualization in a diagnosis system. Also, the results can be combined with other applications, such as a 3D atlas of the thoracic cage, to serve as an efficient aid to physicians in the diagnosis of various bone diseases.

According to an aspect of the invention, there is provided a method for tracing rib posteriors including providing an incomplete rib tracing comprising a digitized 3-dimensional representation of a rib and a digital image from which said rib tracing was extracted, said image comprising a plurality of intensities corresponding to a domain of points on a 3-dimensional grid, initializing a tracing direction for a remainder of said rib, detecting a plurality of ridge points in a sub-volume of said digital image about said initial tracing direction, and deforming a closed curve in a plane perpendicular to said tracing direction until a rib-edge contour is obtained, using said ridge points as constraints.

According to a further aspect of the invention, the method comprises calculating a center point of a cross section enclosed by said rib-edge contour, reinitializing said tracing direction from said center point, and repeating said steps of detecting a plurality of ridge points and deforming a closed curve until a rib end has been reached.

According to a further aspect of the invention, the tracing direction is initialized from a plurality of preceding tracing directions from said incomplete rib tracing using double exponential smoothing.

According to a further aspect of the invention, double exponential smoothing uses equations equivalent to $S_t = \alpha y_t + (1-\alpha)(S_{t-1}+b_{t-1})$, and $b_t = \gamma(S_t-S_{t-1})+(1-\gamma)b_{t-1}$, over a predetermined number of previous iterations of said incomplete rib tracing, wherein $S_t$ is an estimated tracing direction at iteration time t, $b_t$ is a smoothing term, $\alpha$ and $\gamma$ satisfy $0[\alpha[1$ and $0[\gamma[1$, respectively, and $y_t$ is a rib cross-section center point at iteration time t.

According to a further aspect of the invention, detecting a plurality of ridge points comprises using a steerable filter on a sub-region of the image about the tracing direction whose output is a list of points in a plane perpendicular to said tracing direction at different directional orientations with respect to said tracing direction.

According to a further aspect of the invention, deforming a closed curve comprises minimizing an energy function of a plurality of points representing said closed curve, wherein said minimization is constrained by said ridge points.

According to a further aspect of the invention, the energy function comprises a first term that is a function of the distance between a point on said closed curve and a corresponding ridge point, a second term representing a force that causes the closed curve to expand outward, and a third term that causes the curve to contract if a curve point has advanced beyond the ridge points, and helps the curve expand if a curve point is within the ridge points.

According to a further aspect of the invention, the first term is represented by a form equivalent to $$\frac{\alpha}{l(V)} \|v'_j - \delta \times (v_{j-1} + v_{j+1})\|^2$$

wherein $\alpha$ is a predetermined constant, $$\delta = \frac{1}{2\cos(2\pi/n)}, v'_j$$

is a point on the curve being deformed, $v_{j+1}$ and $v_{j-1}$ are ridge points, and l(V) is the length of the curve.

According to a further aspect of the invention, the second term represents a constant outward force.

According to a further aspect of the invention, the third term has a negative value when a curve point is within said ridge points and a positive value otherwise.

According to another aspect of the invention, there is provided a program storage device readable by a computer, tangibly embodying a program of instructions executable by the computer to perform the method steps for tracing rib posteriors.

DETAILED DESCRIPTION OF THE PREFERRED EMBODIMENTS

Figure 1:
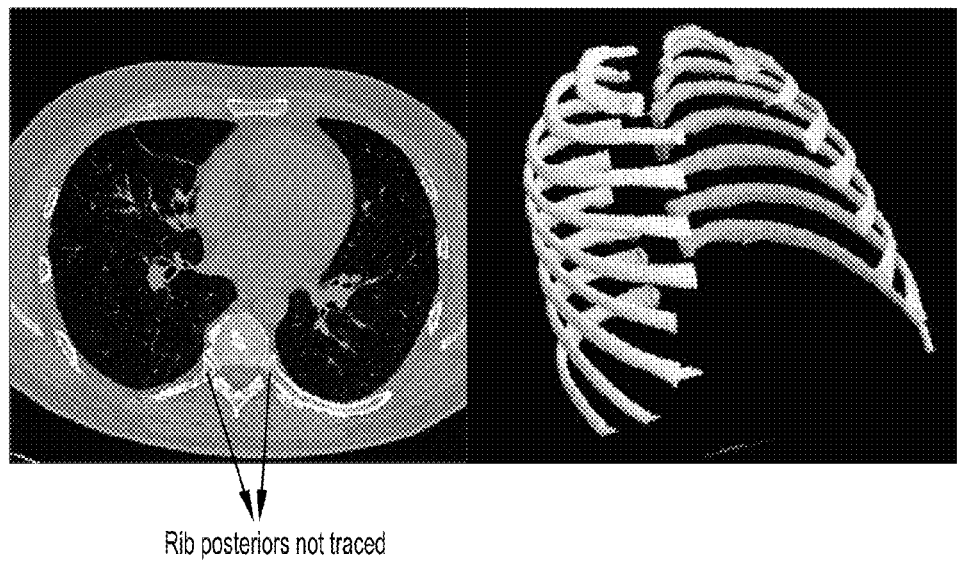
FIG. 1 presents sample results of a tracing based algorithm to extract individual rib centerlines and boundaries.

Exemplary embodiments of the invention as described herein generally include systems and methods for tracing rib posteriors using a ridge based approach, starting from the segmentation result from the method of Shen, et al. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Figure 2:
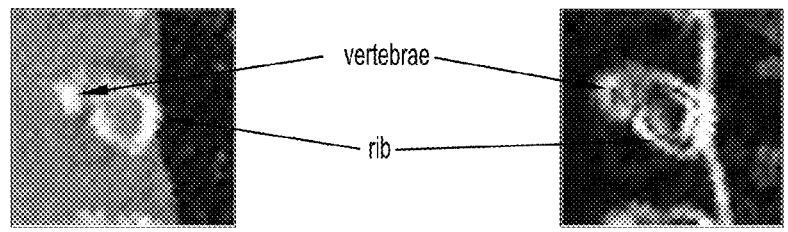
FIG. 2 depicts examples of a gap between two bone structures, according to an embodiment of the invention.

The method of Shen, et al., is based on recursive tracing. At each tracing step, the method first finds the edge locations of the rib cross-section in 20 directions within the plane of the cross-section. Then, the covariance matrix of the edge directions is formed and eigen-analysis is performed with this matrix. The tracing direction is the eigenvector associated with the smallest eigenvalue. When tracing toward the posterior, this routine continues until the gathered edge locations fail to meet a shape requirement and therefore cannot be used for the eigen-analysis. This occurs when another bone-like structure is present in the plane and is very close or connected to the rib being traced. An example is shown in FIG. 2. The left image of FIG. 2 depicts the intensity of the tracing place of the rib cross-section, while the right image depicts the gradient map. Vertebrae and ribs are indicated by the arrows. In both images, there is a gap between the two bone structures. But it is impossible to define a threshold to detect such a gap.

A method according to an embodiment of the invention continues the tracing from this point. According to an embodiment of the invention, a 2D ridge detector is used instead of gradient map to find the rib edges. The new center of the rib cross-section is calculated and tracing continues from the new center to the next plane. Tracing stops when the rib cross-section is sufficiently small, meaning the rib end has been reached.

Figure 8:
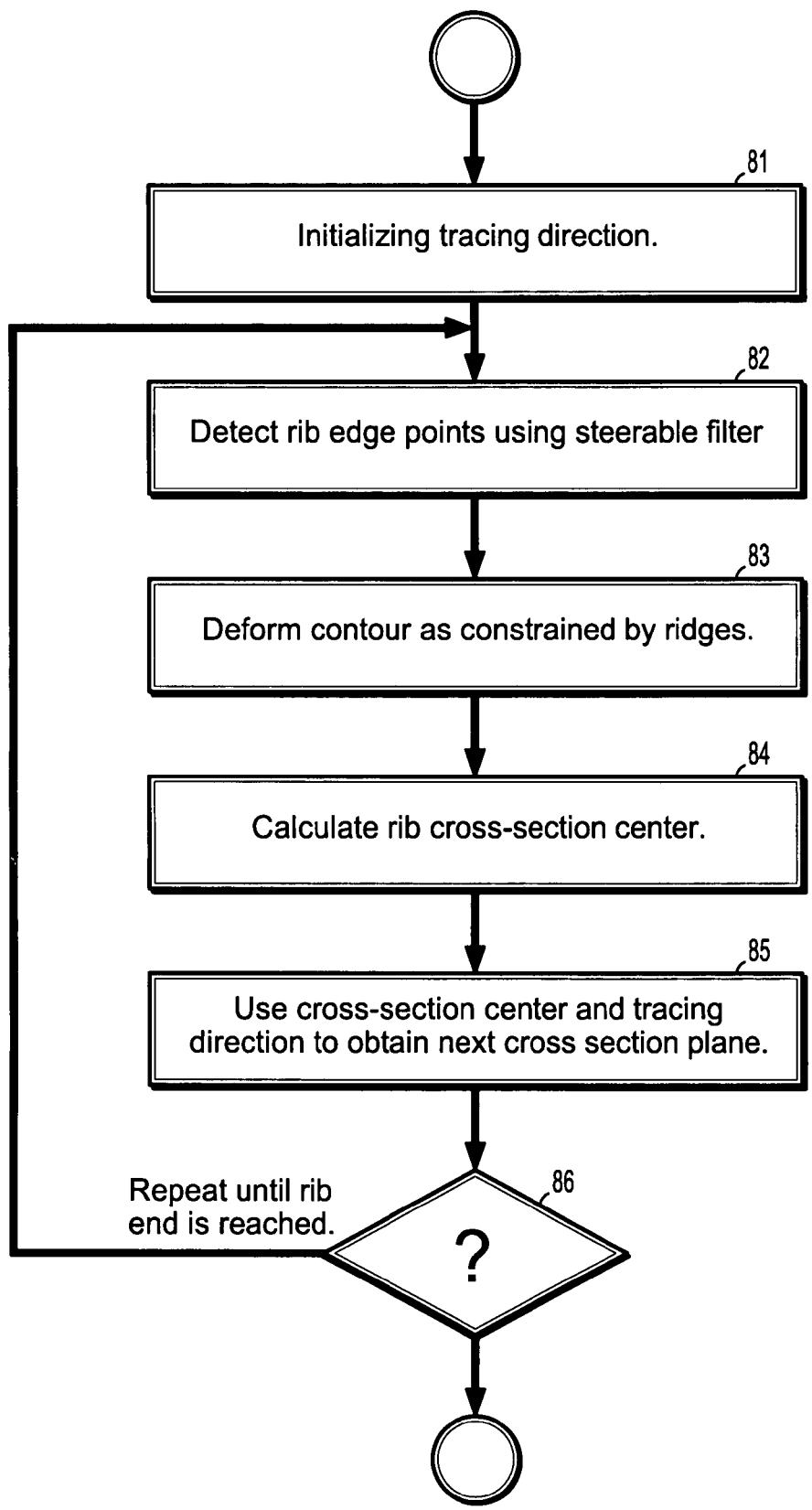
FIG. 8 is a flowchart of a rib posterior tracing algorithm according to an embodiment of the invention.

FIG. 8 is a flowchart of a ridge-based rib tracing method according to an embodiment of the invention. The inputs for a method according to an embodiment of the invention include the tracing result of the method of Shen, et al., along with the image from which the rib tracing was extracted. In a first step 81, the tracing direction is calculated. Unlike the tracing method used in Shen, et al., the tracing direction for a rib posterior will be a constant, that is, it will not be recalculated for each plane. This is because the rib cross-section planes are already close to the vertebrae and there are no significant deviations from the rib path in this direction. This direction is determined based on the previous tracing directions.

According to an embodiment of the invention, the previous 10 directions are uses with double exponential smoothing to initialize the new tracing direction. Double exponential smoothing is a scheme to produce a smoothed time series. Unlike moving averages, recent observations are given relatively more weight in forecasting than the older observations.

Figure 3:
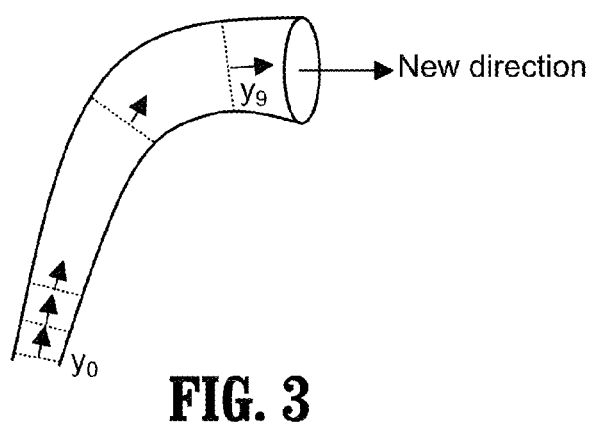
FIG. 3 illustrates the tracing direction calculation for tracing a rib posterior, according to an embodiment of the invention.

The two equations associated with double exponential smoothing are:

$$S_t = \alpha y_t + (1-\alpha)(S_{t-1} + b_{t-1}) \quad 0 \leq \alpha \leq 1,$$

$$B_t = \gamma(S_t - S_{t-1}) + (1-\gamma)b_{t-1} \quad 0 \leq \gamma \leq 1,$$

where $y_t$ stands for new observation at time t, $S_t$ and $b_t$ are estimates. The first equation updates new estimate $S_t$ based on the trend of previous period and the second equation smoothes the trend ($b_t$). In a method according to an embodiment of the invention, $S_t$ is calculated from 10 previous tracing directions. FIG. 3 illustrates the tracing direction calculation for tracing a rib posterior, where the higher weight given to recent observations can take account of the curve at the end of the previous data set. The tracing direction for each iteration is indicated by $y_0$, with the final arrow being the new direction.

At a next step 82, ridges are detected. According to an embodiment of the invention, a 2D ridge detector based on a local energy measurement is used. A ridge is a high intensity edge, while a low intensity edge is referred to as a valley. Ridges and valleys are detected on each rib cross-section plane by using a steerable filter. The idea is to synthesize filters of arbitrary orientations from linear combinations of basis filters, allowing one to adaptively steer a filter to any orientation.

Any 2D function f(x,y) that can be expressed as a Fourier series in angle, e.g.

$$f(r, \phi) = \sum_{n=-N}^{N} a_n(r)\exp(in\phi),$$

or in a polynomial expansion in x and y times a radially symmetric window can be expressed in terms of steerable filters:

$$f^\theta(x, y) = \sum_{j=1}^{M} k_j(\theta) f^{\theta_j}(x, y),$$

or $$f^\theta(x, y) = \sum_l \sum_j k_{lj}(\theta) x^l y^j.$$

The interpolation functions $k_j(\theta)$ are solutions of $$\begin{pmatrix} 1 \\ e^{i\theta} \\ \vdots \\ e^{iN\theta} \end{pmatrix} = \begin{pmatrix} 1 & 1 & \cdots & 1 \\ e^{i\theta_1} & e^{i\theta_2} & \cdots & e^{i\theta_M} \\ \vdots & \vdots & & \vdots \\ e^{iN\theta_1} & e^{iN\theta_2} & \cdots & e^{iN\theta_M} \end{pmatrix} \begin{pmatrix} k_1(\theta) \\ k_2(\theta) \\ \vdots \\ k_M(\theta) \end{pmatrix}.$$

If $f(x,y) = W(r)P_N(x,y)$, where W(r) is an arbitrary windowing function, and $P_N(x,y)$ is an $N^{th}$-order polynomial whose coefficients may depend on r, then f(x,y) rotated to any angle can be synthesized by linear combinations of 2N+1 basis functions. Derivatives of Gaussians of all orders are steerable because each is a polynomial times a radially symmetric window function. If a continuous function is steerable, a sampled version of it is steerable in exactly the same manner because the order of spatial sampling and steering are interchangeable. The weighted sum of a set of spatially sampled basis functions is equivalent to the spatial sampling of the weighted sum of continuous basis functions. Thus, one can obtain a digital steerable filter by sampling a continuous filter.

According to an embodiment of the invention, the input to the steerable filter is an M % M subset of a plane of the original image that is perpendicular to the tracing direction. An exemplary, non-limiting value of M is 51. Filter parameters are calculated, including interpolation functions $k_j(\theta)$, second order Gaussian derivatives and polynomial fits to their Hilbert Transforms $G_2$ and $H_2$, and separable basis sets for both $G_2$ and $H_2$, i.e. $G_{2a}$, $G_{2b}$, $G_{2c}$, and $H_{2a}$, $H_{2b}$, $H_{2c}$, and $H_{2d}$. The input image is convolved with the second order Gaussian derivative kernel and the kernel of its Hilbert transform, which act as a bandpass filter, after which the direction and strength of the dominant orientation of each pixel in the input set are obtained. Given the direction and strength of each pixel, edges, dark lines (which correspond to valleys), and light lines (which correspond to ridges) can be detected. Exemplary, non-limiting pseudo-code for performing this detection for each pixel labeled by (ij) is as follows.

--- angle = direction(i, j) − $\frac{\pi}{2}$ if $\left(\text{angle} >= -\frac{\pi}{2} \text{ and angle} <= \frac{\pi}{2}\right)$ then Edge(i,j) = strength(i,j) % cos²(angle)
end
angle = direction(i,j), if $\left(\text{angle} >= -\frac{\pi}{2} \text{ and angle} <= \frac{\pi}{2}\right)$ then Dark_line(i,j) = strength(i,j) % cos⁶(angle)
end
angle = direction(i,j) − π, if $\left(\text{angle} >= -\frac{\pi}{2} \text{ and angle} <= \frac{\pi}{2}\right)$ then Light_line(i,j) = strength(i,j) % cos²(angle)
end

---

Final ridges and valleys are obtained by applying thresholds to Light_line and Dark_line. The filter output is a list of points represented as a function of orientation. Note that the output of the steerable filter is not necessarily a rib edge, but rather an indicator of where the rib edge might be.

Figure 4:
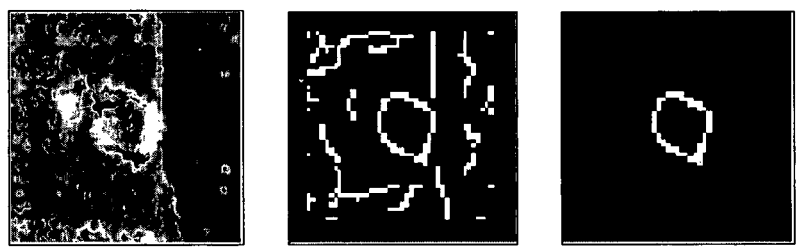
FIG. 4 shows an example of ridges detected by the ridge detector, according to an embodiment of the invention.

FIG. 4 shows an example of ridges detected by the ridge detector. The left image of the figure shows the tracing plane of the rib cross section. The middle image depicts ridges detected by the 2D steerable filter, and the right image depicts the ridges after filtering. The initial detected ridges are further filtered based on the knowledge of proximate rib location.

Figure 5:
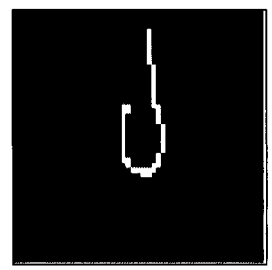
FIG. 5 depicts a detected ridge that is not a closed curve, according to an embodiment of the invention.

The ridge edges thus detected are represented by a closed curve deformed at step 83. The purpose of detecting ridges is to help find the true rib edges. Ideally the ridge positions can be taken as the desired result. But in some cases, the detected ridge is not a closed curve, as shown in FIG. 5. To make sure the rib edge locations do not leak into the vertebrae or other neighboring bone structures and also to obtain a smooth contour, the edge is determined from a simple closed curve allowed to deform from a small circle toward the ridge The curve is defined in a plane perpendicular to the tracing direction, and is represented by a set of points. According, to an embodiment of the invention, there is one curve point for each direction. Smoothness of the moving edge is controlled by a smoothing term in an energy function of the deformation.

The edge locations are searched along 20 directions. The rib edge to be located is represented by the set of edge points $V = \{v_0, \ldots, v_{19}\}$ output by the steerable filter, where $v_i = (x_i, y_i)$, the 2D coordinates of each edge point. The energy function is defined as $$E = \sum_{i=0}^{N-1} (\alpha E_{com}(v_1) + \beta E_{bal}(v_i) + \gamma E_{ext}(v_i)),$$

where α, β, and γ are pre-determined constants, and N is the number of edges, which according to an embodiment of the invention, is 20 The first term on the right side of the energy equation is a continuity energy, defined as:

$$E_{com}(v_j) = \frac{1}{l(V)} \|v'_j - \delta \times (v_{j-1} + v_{j+1})\|^2,$$

where $$\delta = \frac{1}{2\cos(2\pi/n)}, v'_j$$

is a point on the curve being deformed, $v_{j+1}$ and $v_{j-1}$ are ridge points, and l(V) is the length of the curve. The continuity energy defined above pushes the deformable contour outward into a circle. This energy function is used as a smoothing term. The next term in the energy, $E_{bal}$, is a constant balloon force which forces the contour to expand. The last term in the energy, $E_{ext}$, is an external energy that acts as a constraint term. This term forces the curve to contract if a curve point has advanced beyond the ridge points, and helps the curve expand if a curve point is within the ridge points. An exemplary, non-limiting external energy is defined as:

$$E_{ext}(v'_j) = \begin{cases} -1 & \text{ridge}(j) = 0 \\ +2 & \text{ridge}(j) < 0 \end{cases},$$

where ridge(j)=0 indicates that curve point $v_j$ is within the region enclosed by the ridge points. This definition of external energy means that the contour deformation will be constrained by the ridge detected on this plane. All three energy terms are regulated by normalizing each energy term and adjusting the corresponding weight.

Figure 6:
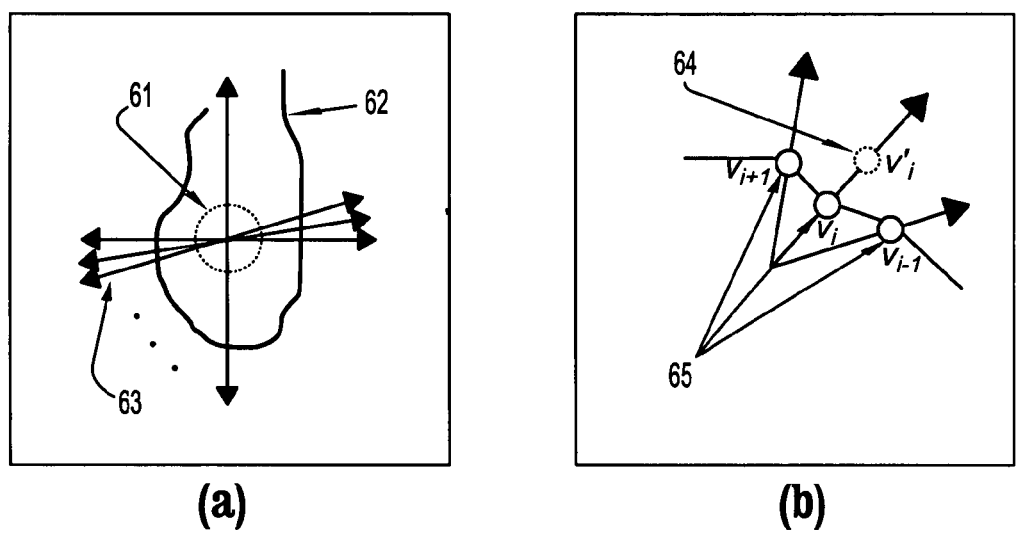
FIGS. 6(a)-(b) depicts how rib edge deformation is constrained by the ridge, according to an embodiment of the invention.

FIGS. 6(a)-(b) depicts how rib edge deformation is constrained by the ridge, according to an embodiment of the invention. The contour is deformed by minimizing the energy function until a local energy minimum is reached, the result being a ridge edge contour. The small circle 61 in FIG. 6(a) is the initial front (edge) when the deformation starts, with ridge 62 having been detected by the steerable filter. Note that the small circle depicted in FIG. 6(a) is exemplary, and any simple closed curve in a plane about the tracing direction vector can be used to initialize the contour. At any time during the deformation, the front includes 20 points 63, that is, one point for each direction/edge. For an arbitrary iteration, FIG. 6(b) shows three edge locations $v_{i-1}$, $v_i$, $v_{i+1}$ 65 of the current deformable contour, and the next location 64 to be evaluated for one of those points $v_i$. At each iteration, every edge point on the front moves either forward or backward along its direction as indicated in FIG. 6(b). Its moving direction (forward or backward) is determined by the evaluation of the energy functional as defined above. The contour always moves in a direction that lowers the energy. If there are no constraints, the front will move outward, as the circle will grow constantly because of the balloon force. With the constraints, such as continuity energy term which smoothes the front, and the external energy term, the final rib edge should be close to the detected ridge. If the initial edge is far from the ridge, these constrain forces are the major forces that drive the deformation. After the contour has been deformed, that is, the energy functional has reached a minimum, a rib cross-section center is calculated at step 84 from the 20 edge locations.

The next cross-section plane is determined at step 85 from this new center together by advancing a step in the tracing direction described previously. An exemplary, non-limiting step size is 1 mm. The iterations of steps 82 to 85 are repeated at step 86 until the rib cross-section is sufficiently small, which occurs when a rib end has been reached.

Figure 7:
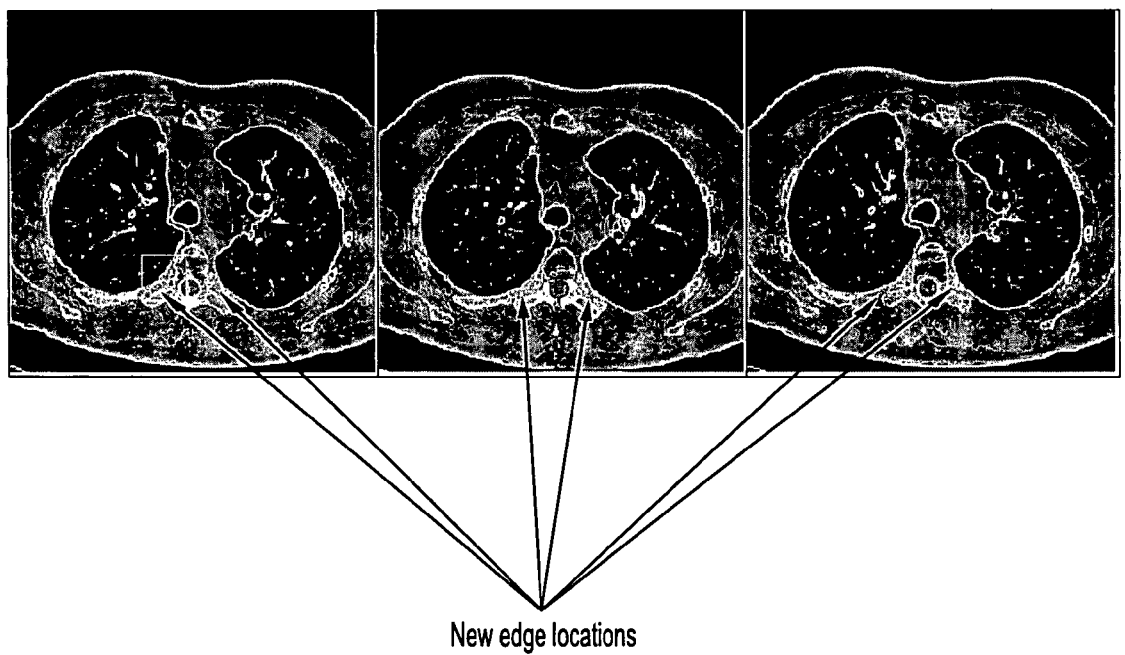
FIG. 7 depicts sample tracing results of a rib tracing method according to an embodiment of the invention.

A tracing procedure according to an embodiment of the invention can trace rib posteriors. Sample tracing results for 3 examples are shown in FIG. 7, with new edge locations as indicated by the arrows.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 9:
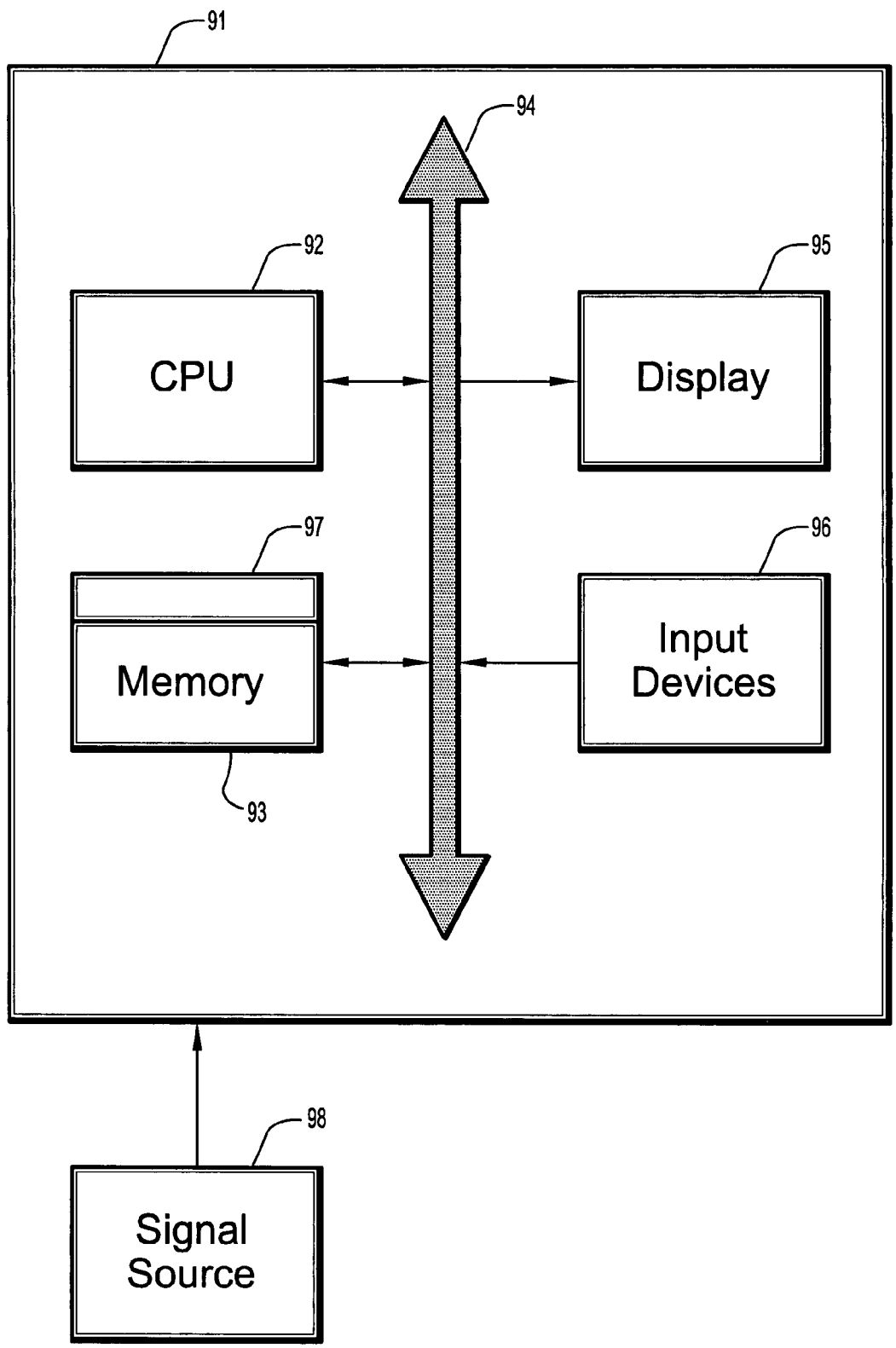
FIG. 9 is a block diagram of an exemplary computer system for implementing a rib posterior tracing algorithm, according to an embodiment of the inventions

FIG. 9 is a block diagram of an exemplary computer system for implementing a rib posterior tracing method according to an embodiment of the invention. Referring now to FIG. 9, a computer system 91 for implementing the present invention can comprise, inter alia, a central processing unit (CPU) 92, a memory 93 and an input/output (I/O) interface 94. The computer system 91 is generally coupled through the I/O interface 94 to a display 95 and various input devices 96 such as a mouse and a keyboard. The support circuits can include circuits such as cache, power supplies, clock circuits, and a communication bus. The memory 93 can include random access memory (RAM), read only memory (ROM), disk drive, tape drive, etc., or a combinations thereof. The present invention can be implemented as a routine 97 that is stored in memory 93 and executed by the CPU 92 to process the signal from the signal source 98. As such, the computer system 91 is a general purpose computer system that becomes a specific purpose computer system when executing the routine 97 of the present invention.

The computer system 91 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for tracing rib posteriors comprising the steps of:

providing an incomplete rib tracing comprising a digitized 3-dimensional representation of a rib and a digital image from which said rib tracing was extracted, said image comprising a plurality of intensities corresponding to a domain of points on a 3-dimensional grid;

initializing a tracing direction for a remainder of said rib;

detecting a plurality of ridge points in a sub-volume of said digital image about said initial tracing direction, wherein a ridge point is a point in a high intensity edge; and deforming a closed curve in a plane perpendicular to said tracing direction until a rib-edge contour is obtained, using said ridge points as constraints, wherein said incomplete rib tracing is extended by incorporating points on said rib-edge contour.

2. The method of claim 1, further comprising calculating a center point of a cross section enclosed by said rib-edge contour, reinitializing said tracing direction from said center point, and repeating said steps of detecting a plurality of ridge points and deforming a closed curve until a rib end has been reached.

3. The method of claim 1, wherein said tracing direction is initialized from a plurality of preceding tracing directions from said incomplete rib tracing using double exponential smoothing.

4. The method of claim 3, wherein said double exponential smoothing uses equations equivalent to $$S_t = \alpha y_t + (1-\alpha)(S_{t-1} + b_{t-1}),$$

and $$b_t = \gamma(S_t - S_{t-1}) + (1-\gamma)b_{t-1},$$

over a pre-determined number of previous iterations of said incomplete rib tracing, wherein $S_t$ is an estimated tracing direction at iteration time t, $b_t$ is a smoothing term, $\alpha$ and $\gamma$ satisfy $0 \leq \alpha \leq 1$ and $0 \leq \gamma \leq 1$, respectively, and $y_t$ is a rib cross-section center point at iteration time t.

5. The method of claim 1, wherein detecting a plurality of ridge points comprises using a steerable filter on a sub-region of the image about the tracing direction whose output is a list of points in a plane perpendicular to said tracing direction at different directional orientations with respect to said tracing direction.

6. The method of claim 1, wherein deforming a closed curve comprises minimizing an energy function of a plurality of points representing said closed curve, wherein said minimization is constrained by said ridge points.

7. The method of claim 6, wherein said energy function comprises a first term that is a function of the distance between a point on said closed curve and a corresponding ridge point, a second term representing a force that causes the closed curve to expand outward, and a third term that causes the curve to contract if a curve point has advanced beyond the ridge points, and helps the curve expand if a curve point is within the ridge points.

8. The method of claim 7, wherein said first term is represented by a form equivalent to $$\frac{\alpha}{l(V)}\|v'_j - \delta \times (v_{j-1} + v_{j+1})\|^2$$

wherein $\alpha$ is a pre-determined constant, $$\delta = \frac{1}{2\cos(2\pi/n)}, v'_j$$

is a point on the curve being deformed, $v_{j+1}$ and $v_{j-1}$ are ridge points, $l(V)$ is the length of the curve, and n is the number of the plurality of points.

9. The method of claim 7, wherein said second term represents a constant outward force.

10. The method of claim 7, wherein said third term has a negative value when a curve point is within said ridge points and a positive value otherwise.

11. A method for tracing rib posteriors comprising the steps of:
providing a digital image comprising a plurality of intensities corresponding to a domain of points on a 3-dimensional grid;
locating a starting point for a posterior portion of a rib in said digital image;
initializing a tracing direction for said posterior portion of said rib;
detecting a plurality of ridge points by convolving a sub-region of an image slice perpendicular to the tracing direction with orientable basis functions to obtain a direction and strength of a dominant orientation for each point in said sub-region, wherein a ridge point is a point in a high intensity edge; and
minimizing an energy function of a plurality of points representing a closed curve in a plane perpendicular to said tracing direction until a rib-edge contour is obtained, wherein said minimization is constrained by said ridge points; and
incorporating points from said rib-edge contour into a rib posterior tracing.

12. The method of claim 11, wherein locating a starting point comprises providing an incomplete rib tracing comprising a digitized 3-dimensional representation of a rib, wherein said starting point corresponds to the ending point of said incomplete rib tracing.

13. The method of claim 11, wherein said orientable basis functions are the separable basis functions of a second order Gaussian derivative and its Hilbert transform, and further comprising determining an angle for each point, and multiplying the strength of each point with a function of the angle wherein whether said point can be considered an edge, a ridge, or a valley is determined.

14. A non-transitory program storage device readable by a computer, tangibly embodying a program of instructions executable by the computer to perform the method steps for tracing rib posteriors, said method comprising the steps of: providing an incomplete rib tracing comprising a digitized 3-dimensional representation of a rib and a digital image from which said rib tracing was extracted, said image comprising a plurality of intensities corresponding to a domain of points on a 3-dimensional grid; initializing a tracing direction for a remainder of said rib; detecting a plurality of ridge points in a sub-volume of said digital image about said initial tracing direction, wherein a ridge point is a point in a high intensity edge; and deforming a closed curve in a plane perpendicular to said tracing direction until a rib-edge contour is obtained, using said ridge points as constraints, wherein said incomplete rib tracing is extended by incorporating points on said rib-edge contour.

15. The computer readable program storage device of claim 14, the method further comprising calculating a center point of a cross section enclosed by said rib-edge contour, reinitializing said tracing direction from said center point, and repeating said steps of detecting a plurality of ridge points and deforming a closed curve until a rib end has been reached.

16. The computer readable program storage device of claim 14, wherein said tracing direction is initialized from a plurality of preceding tracing directions from said incomplete rib tracing using double exponential smoothing.

17. The computer readable program storage device of claim 16, wherein said double exponential smoothing uses equations equivalent to $$S_t = \alpha y_t + (1-\alpha)(S_{t-1} + b_{t-1}),$$

and $$b_t = \gamma(S_t - S_{t-1}) + (1-\gamma)b_{t-1},$$

over a pre-determined number of previous iterations of said incomplete rib tracing, wherein $S_t$, is an estimated tracing direction at iteration time t, $b_t$ is a smoothing term, $\alpha$ and $\gamma$ satisfy $0 \leq \alpha \leq 1$ and $0 \leq \gamma \leq 1$, respectively, and $y_t$ is a rib cross-section center point at iteration time t.

18. The computer readable program storage device of claim 14, wherein detecting a plurality of ridge points comprises using a steerable filter on a sub-region of the image about the tracing direction whose output is a list of points in a plane perpendicular to said tracing direction at different directional orientations with respect to said tracing direction.

19. The computer readable program storage device of claim 14, wherein deforming a closed curve comprises minimizing an energy function of a plurality of points representing said closed curve, wherein said minimization is constrained by said ridge points.

20. The computer readable program storage device of claim 19, wherein said energy function comprises a first term that is a function of the distance between a point on said closed curve and a corresponding ridge point, a second term representing a force that causes the closed curve to expand outward, and a third term that causes the curve to contract if a curve point has advanced beyond the ridge points, and helps the curve expand if a curve point is within the ridge points.

21. The computer readable program storage device of claim 20, wherein said first term is represented by a form equivalent to $$\frac{\alpha}{l(V)}\|v'_j - \delta \times (v_{j-1} + v_{j-1})\|^2$$

wherein $\alpha$ is a pre-determined constant, $$\delta = \frac{1}{2\cos(2\pi/n)}, v'_j$$

is a point on the curve being deformed, $v_{j+1}$ and $v_{j-1}$ are ridge points, l(V) is the length of the curve, and n is the number of the plurality of points.

22. The computer readable program storage device of claim 20, wherein said second term represents a constant outward force.

23. The computer readable program storage device of claim 20, wherein said third term has a negative value when a curve point is within said ridge points and a positive value otherwise.

* * * * *